United States Patent
Gerner

(10) Patent No.: US 11,243,827 B2
(45) Date of Patent: Feb. 8, 2022

(54) CONTROLLING LOCATION-BASED FEATURES WITH USAGE MAPS

(71) Applicant: salesforce.com, inc., San Francisco, CA (US)

(72) Inventor: Jason Gerner, Brownsburg, IN (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/913,200

(22) Filed: Jun. 26, 2020

(65) Prior Publication Data

US 2021/0406103 A1    Dec. 30, 2021

(51) Int. Cl.
*G06F 9/54* (2006.01)
*H04W 4/021* (2018.01)

(52) U.S. Cl.
CPC .............. *G06F 9/547* (2013.01); *G06F 9/541* (2013.01); *H04W 4/021* (2013.01)

(58) Field of Classification Search
None
See application file for complete search history.

(56) References Cited

U.S. PATENT DOCUMENTS

| 2016/0142872 A1* | 5/2016 | Nicholson | H04L 67/26 455/456.1 |
| 2016/0142979 A1* | 5/2016 | MacGougan | H04W 4/021 455/456.4 |
| 2017/0343377 A1* | 11/2017 | Holden | G01C 21/3682 |
| 2020/0014791 A1* | 1/2020 | Rodriguez Bravo | H04M 1/72577 |
| 2020/0192706 A1* | 6/2020 | Huus | G06F 9/505 |
| 2020/0374365 A1* | 11/2020 | Gandhi | H04L 63/0236 |

* cited by examiner

Primary Examiner — Charles E Anya
(74) Attorney, Agent, or Firm — Butzel Long

(57) ABSTRACT

Systems, device and techniques are disclosed for controlling location-based features with usage maps. An application running on a device may receive a current location of the device. The application may determine a sector of a usage map that corresponds to the current location of the device. The usage map may be associated with the application and he usage map may include a map of a geographic area divided into sectors. The application may modify the operation of a remote API call of the application based on the sector of the usage map that corresponds to the current location of the device by disabling or rate-limiting the remote API call.

18 Claims, 6 Drawing Sheets

CONTROLLING LOCATION-BASED FEATURES WITH USAGE MAPS

BACKGROUND

Applications running on mobile computing devices may send API calls to a server system to retrieve data that is based on the current location of the mobile computing device. A server system may see a high-volume of such API calls. Some of the API calls may return no useful data due to the current location of the mobile computing device that submitted the API call, resulting in the server system unnecessarily using resources to respond to the API call. An application may also include other features that may be based on the current location of the mobile computing device on which the application is running, and may make unnecessary use of computational resources when the mobile computing device is in a location where the features are not useful.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
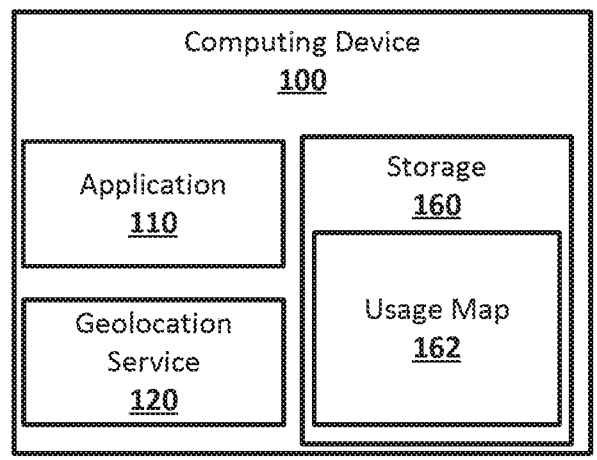
FIG. 1 shows an example system for controlling location-based features with usage maps according to an implementation of the disclosed subject matter.

Techniques disclosed herein enable controlling location-based features with usage maps, which may allow for a usage map that may control the location-based features of an application running on a computing device based on the current location of the computing device. A usage map for an application may divide a geographic area into sectors. Each sector of the usage map may be encoded with data that may be used by the application to determine which location-based features of the application should be used when the current location of the computing device the application is running on is in that sector. Usage maps may be created on a per-application basis, with the size and shape of the sectors, and the data encoded in the sectors, varying for different usage maps for different applications. An application may have multiple usage maps which may have different sectors sizes. An application with multiple usage maps may choose a usage map based on its current location. An application may also use multiple usage maps simultaneously, with different usage maps controlling different location-based features of the application.

An application running on a computing device may include location-based features. The application may be any suitable application that may run on computing device, such as a smartphone, tablet, laptop, wearable device, or in-vehicle device, that may be mobile. The computing device may be able to determine its own location in any suitable manner, including, for example, through GPS, WiFi, or cellular location determination. The location-based features of the application may use the location of the computing device, as determined by the computing device, to perform various operations. For example, the application may make API calls to a remote server system. The API call may include the current location of the computing device on which the application is running, and the remote server system may respond to the API call with data that is based on the current location of the computing device as included in the API call. For example, the API call may be to an API of the server system that provides geofences that the application may monitor based on the current location of the computing device that the application is running on. The application may also include location-based features that are local API calls to other applications or the operating system running on the computing device, or that are location-based procedures that are built-in to the application itself.

An application may have a usage map. The usage map may be a map of any suitable geographic area, including, for example, the surface of the Earth. The usage map may be divided into sectors. The sectors may be of any suitable size and shape. For example, all of the sectors on a usage map may be square and of the same size, resulting in the usage map being a grid that covers the geographic area. Each sector of a usage map may be encoded with data that may be used by the application to determine which location-based features of the application should be used when the current location of the computing device the application is running on is in that sector. The usage map may control any number of location-based features of the application. For example, the usage map may control a single location-based feature, multiple location-based features, or all location-based features of the application. The sectors of the usage map for the application may include encoded data that is "on/off." The application may use any location-based features controlled by the usage map when the computing device that the application is running on is located in an "on" sector, and may not use any location-based features controlled by the usage map when the computing device is located in an "off" sector. A usage map may also be more complex, and may have more granular instructions encoded into its sectors. For example, if an application has three location-based features, one sector of the usage map may allow for the use of two of the location-based features but block the third location based feature, for example, while another sector of the usage map may allow the third location-based feature but rate-limit the application to using the third location-based feature once per day.

A usage map for an application may be generated specifically for that application. The encoding of the sectors in the usage map may be based on the nature of the application that the usage map is generated for. For example, a usage map for an application associated with a restaurant may encode sectors of the usage map that include, or are adjacent to a sector that includes, a location of the restaurant as "on" sectors, while all other sectors may be "off" sectors. The sectors of the usage map may control, for example, remote API calls that request geofences that may be used by the application to determine when the computing device the application is running on is near a location of the restaurant in order to retrieve relevant data for that location of the restaurant or present a notification to a user of the application. A usage map for an application associated with a different restaurant, with different locations, may have its sectors encoded based on the locations of that restaurant. Each applications' usage maps may be unique, having been generated for that application. The data encoded in the sectors of a usage map may control any number of location-based features of an application. For example, a single usage map associated with an application may control one location-based feature of an application, multiple location-based features of the application, or all location-based features of the application.

A usage map may be encoded and stored in any suitable format and transmitted from a server to an application. The server, which may be part of the same server system to which an application sends remote API calls or part of a different server system, may generate a usage map using any suitable data. The data may be, for example, provided by the developer of the application, or by an organization associated with the application. For example, a restaurant may provide data including the geolocations of all of its restaurant locations to the server, which may use the geolocations to generate a usage map for the application.

The usage map generated by the server may be encoded and stored in any suitable manner. For example, the grid of a usage map may be encoded as an array that stores binary values, or "0" for an "off" sector, and "1" for an "on" sector. The encoded usage map may appear as, for example, "000010010000000001000000000000101000000000-001000001" for a usage map that includes 54 sectors in a 6×9 grid, with the rows of the grid being listed sequentially. Such a binary encoding may be further encoded as 32-bit or 64-bit integer which may be transmitted from the server to the application, which may convert the integer back into the binary encoded usage map. A binary encoded usage map may also be compressed using any suitable form of run-length encoding, which may then be converted into a base64 string and sent to the application as a JSON response payload. The application may use the binary encoded usage map by determining which sector of the usage map the computing device the application is running on is in based on the current location of the computing device and retrieving the binary value for that sector. For example, if the application determines that the computing device is currently located in the sector at x-y coordinates (4,5), which may be the $5^{th}$ sector in the $4^{th}$ row of the usage map, the application may retrieve the binary value of "0", and may decode this as an "off" sector.

A usage map may be encoded as an image. The usage map may be encoded as a bitmap, where, for example, a black pixel may represent an "on" sector and a white pixel may represent an "off" sector. The application may use the usage map by checking the color of the pixel of the image that corresponds to the sector in which the computing device the application is running on is currently located. The use of an image may allow for the usage map to be transmitted from the server to the computing device using a smaller amount of bandwidth, as an image usage map may be compressed to be smaller than a binary encoded usage map.

A usage map may be encoded by storing only the "on" sectors based on their coordinates within the grid of the usage map. For example, a usage map may be encoded as "map": "12,70; 110,2." Such an encoding may indicate that the sectors located at x-y coordinates (12,70) and (110,2) in the grid of the usage map may be "on" sectors, while all other sectors may be "off" sectors. A usage map encoded with only "on" sectors may be compressed using any suitable form of run-length encoding and turned into a base64 string.

The encoded data in the sectors of a usage map may be binary, for example, as in an "on/off" usage map, or may have any suitable number of states. For example, a sector may be encoded with one of four possible states, "on", "off", "rate-limit: once-per-day", and "rate-limit: once per hour". The additional states may be represented in any suitable manner in the encoding of a usage map. For example, instead of an array of binary values, the usage map may be represented with an array of four possible values, "0", "1", "2", and "3". An image usage map may use four colors, for example, black, white, red, and green. A usage map that is encoded with coordinates may include a third value, for example, "1", "2", or "3", along with each set of x-y coordinates, with each sector not identified by its x-y coordinates assumed to be "0". If a usage map controls more than one feature, sectors may be encoded with additional data that indicates which features that sector controls. This may allow a usage map to have any suitable level of granularity in its control over the location-based features of an application, both modifying the operating of location-based features in any suitable manner, and separately controlling different location-based features in different manners from the same sector of a usage map.

After being generated, a usage map may be sent to the application the usage map was generated for. For example, the server may send the usage map to all instances of the application on any computing device on which the application is installed. The usage map may be sent as, for example, part of an update to the application, or may be sent to the application out-of-band, for example, outside of regular application updates. The usage map for an application may be updated and resent to the application at any suitable intervals. For example, a usage map for an application associated with a restaurant may be updated when locations of the restaurant open or close, and the updated usage map may be sent to computing devices running the application to replace a previous usage map from before the opening or closure of a location of the restaurant.

A usage map may control the usage of location-based features by an application, including API calls that include location data for the computing device the application is running on. The application may use the usage map in any suitable manner. For example, the application may, at suitable intervals, determine the current location of the computing device on which the application is running through, for example, a local API call to a geolocation service running on the computing device. The application may also determine the current location of the computing device on which the application is running prior to running a location-based feature of the application. For example, the application may, before preparing and sending a remote API call or local API call that use location data, or running a location-based procedure that is part of the application itself, obtain the current location of the computing device on which the application is running in order to check a usage map that controls that location-based feature.

The application may use the current location of the computing device on which the application is running to determine which sector of the usage map for the application the computing device is in based on the current location of the computing device. The application may decode the encoded data for the determined sector of the usage map and may modify the operation of location-based features based on the data decoded from the usage map and the location-based features controlled by the usage map. The application may include built-in procedures for decoding the usage map, which may be based on the manner in which the usage map was encoded by the sever. The usage map may also include data indicating which location-based feature the usage map controls. For example, the application may determine, based on the current location of the computing device on which the application is running, that the computing device is located in a sector of the usage map that is an "off" sector. The usage map may control the use by the application of remote API calls that include location-based data. Based on the computing device being in a sector of the usage map that is encoded as an "off" sector, the application may modify the operation of its remote API calls that include location-based data by disabling their usage. Location-based features may be disabled in any suitable manner, such as, for example, through the setting of a variable that causes a conditional test for the use of the location-based feature to fail. At a later time, the application may determine, based on the current location of the computing device on which the application is running, that the computing device is located in a sector of the usage map that is an "on" sector. The application may modify the operation of its remote API calls that include location-based data by enabling their usage. Usage map sectors may also cause applications to modify the operation of location-based features by, for example, rate-limiting the use of those location-based features. For example, a sector of a usage map may be encoded with data that indicates that the application should only use a location-based feature once per day when the computing device the application is running on is located in that sector. This may result in the application making less use of location-based features, including remote API calls, local API calls, and location-based procedures, when the computing device on which the application is running is in a location where those features and API calls are not considered useful based on the data used to generate the usage map. For example, an application may not make remote API calls requesting geofence data when the computing device on which the application is running is located in an area where the server that receives the request would return no geofences to the application. This may save processing time and battery life of the computing device on which the application us running, and may reduce strain on the servers that the remote API calls are made to.

The application may determine which sector of the usage map the computing device the application is running on is in in any suitable manner. For example, if each sector of the usage map is the same size and the sectors are arranged in a regular grid, the application may only need to know the size of each sector, the height and width of the grid, and the geolocation of a specified corner of any one sector of the usage map in order to determine which sector the computing device is in based on the current location of the computing device.

In some implementations, an application may have multiple associated usage maps. The multiple associated usage maps may be, for example, usage maps with different sector sizes. For example, an application may be associated with two usage maps. The two usage maps may cover the same geographic area, with a first of the usage maps having smaller, and more, sectors, while the second of the usage maps has larger, and fewer sectors. The application may use one or the other of the usage maps depending on the current location of the computing device that the application is running on. This my be encoded into the sectors of the usage maps themselves, for example, with sectors of the first usage map controlling when the application switches to the second usage map, and sectors of the second usage map controlling when the application switches to the first usage map, or may be encoded into a third usage map which the application may check whenever the application determine the current location of the computing device on which the application is running. For example, an application associated with a restaurant may have two usage maps. The usage map with more, smaller, sectors, may be used when the application is in a geographic location in which the restaurant has more, and more densely clustered locations, while the usage map with more, larger sectors may be used when the application is in a geographic location in which the restaurant has fewer locations.

The multiple usage maps may be usage maps that control different location-based features of the application. For example, an application with multiple location-based features may have a separate associated usage map to control each of the location-based features, or to control separate groups of related location-based features. The multiple usage maps may have sectors of different sizes and shapes, such that a sector of one usage map may be cover the same geographic area as multiple sectors from another usage map. The application may use the multiple usage maps at the same time. For example, when the application determines the current location of the computing device on which the application is running, the application may determine which sector the computing is in on all of the usage maps associated with the application. The application may decode the sectors the computing device is located in on all of the usage maps, and may modify the operation of the location-based features based on the data encoded in the sectors. This may result in, for example, locations within a sector of a first usage map where a first location-based feature controlled by the first usage map is enabled while a second location based-feature controlled by a second usage map is disabled and locations with that same sector of the first usage map where the second location based-feature is enabled due to the second usage map having two differently encoded sectors overlapping that sector of the first usage map.

FIG. 1 shows an example system for controlling location-based features with usage maps according to an implementation of the disclosed subject matter. A computing device 100 may be any suitable computing device, such as, for example, a computer 20 as described in FIG. 7, or component thereof. The computing device 100 may include an application 110, geolocation service 120, and a storage 160. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For example, the computing device 100 may be a mobile computing device such as smartphone, laptop, wearable device, or in-vehicle device.

The application 110 may be any suitable application running on the computing device 100. The application 110 may include location-based features. For example, the application 110 may make remote and local API calls using the current location of the computing device 100, and may include location-based procedures within the application 110 that use the current location of the computing device 100. The application 110 may, for example, be an application associated with an organization that has physical locations, such as a restaurant or store, or may otherwise be associated with specific geographic areas or features.

The geolocation service 120 may be any suitable combination of hardware and software on the computing device 100 for determining the current location of the computing device 100. The geolocation service 120 may include, for example, an API that may be called by applications on the computing device 100, such as the application 110, and may return the current location of the computing device 100 as, for example, a geolocation with a longitude and latitude. The geolocation service 120 may determine the location of the computing device 100 using GPS hardware of the computing device 100, WiFi or cellular triangulation, dead reckoning, or in any other suitable manner.

The storage 160 may be any suitable combination of hardware and software for storing data. The storage 160 may include any suitable combination of volatile and non-volatile storage hardware, and may include components of the computing device 100 and hardware accessible to the computing device 100, for example, through wired and wireless direct or network connections. The storage 160 may store a usage map 162, which may be a usage map associated with the application 110.

Figure 2:
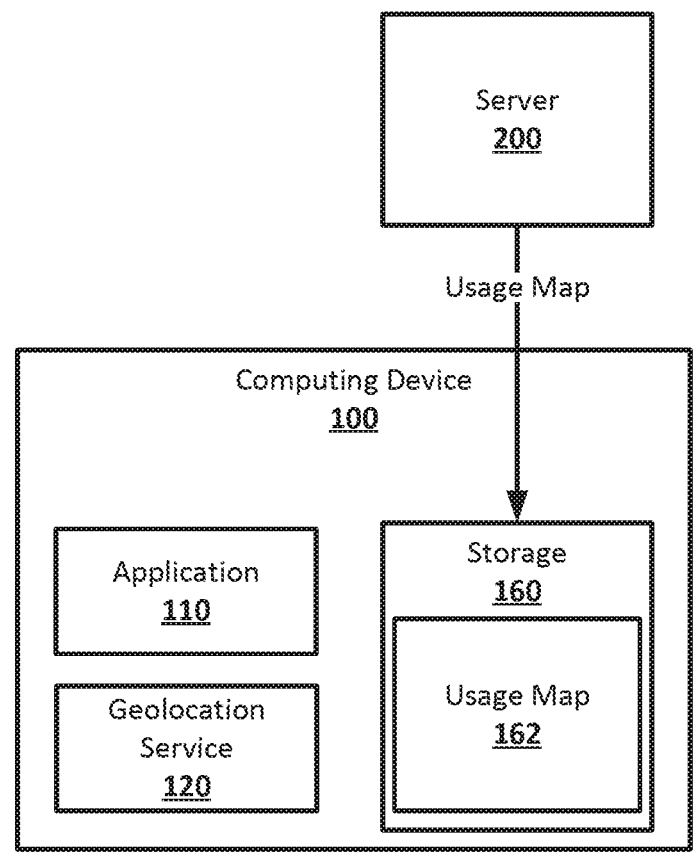
FIG. 2 shows an example arrangement for controlling location-based features with usage maps according to an implementation of the disclosed subject matter.

FIG. 2 shows an example arrangement for controlling location-based features with usage maps according to an implementation of the disclosed subject matter. A server 200 may generate and encode a usage map and send the usage map to the computing device 100, where the usage map may be stored as the usage map 162. The server 200 may be any suitable computing device, such as, for example, a computer 20 as described in FIG. 7, or component thereof. The server 200 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The server 200 may be part of a computing system and network infrastructure, or may be otherwise connected to the computing system and network infrastructure, including a larger server network which may include other server systems similar to the server 200. The server 200 may include any suitable combination of central processing units (CPUs), graphical processing units (GPUs), and tensor processing units (TPUs).

The server 200 may generate the usage map 162 for the application 110 using any suitable data. The data may be, for example, provided by the developer of the application, or by an organization associated with the application. For example, a restaurant may provide data including the geolocations of all of its restaurant locations to the server 200, which may use the geolocations to generate a usage map 162 for the application 110, for example, encoding sectors of the usage map 162 that include a restaurant location as "on" sectors and encoding all other sectors as "off" sectors. The server 200 may use any suitable format and encoding for the usage map 162. For example, usage map may be a binary usage map, with sectors encoded as "1" for "on" and "0" for off. The usage map may also be more granular, for example, encoding sectors as "on", "off", or "rate-limited", with any number of rate-limits, using, for example, multi-bit values, or using multiple pixel colors in an image. For example, a sector may be encoded in an image map as an "on" sector using a black pixel, an "off" sector using a white pixel, and a "rate-limited" sector using a red pixel for a once-per day rate limit and a green pixel for a six-times-per-day rate-limit. Sectors may also be encoded to control specific location-based features if the usage map 162 controls more than one location-based feature of the application 110. The usage map 162 may control any suitable location-based feature of the application 110, such as, for example, remote API calls made by the application 110 that include the current location of the computing device 100 to a sever, such as the server 200.

The server 200 may send the usage map 162 to the computing device 100 at any suitable time, and may update or replace the usage map 162 at any suitable time. For example, the server 200 may generate an updated usage map 162 when there are changes to the data used to generate the usage map 162, for example, the opening or closing of a location of a restaurant that is associated with the application 110.

Figure 3:
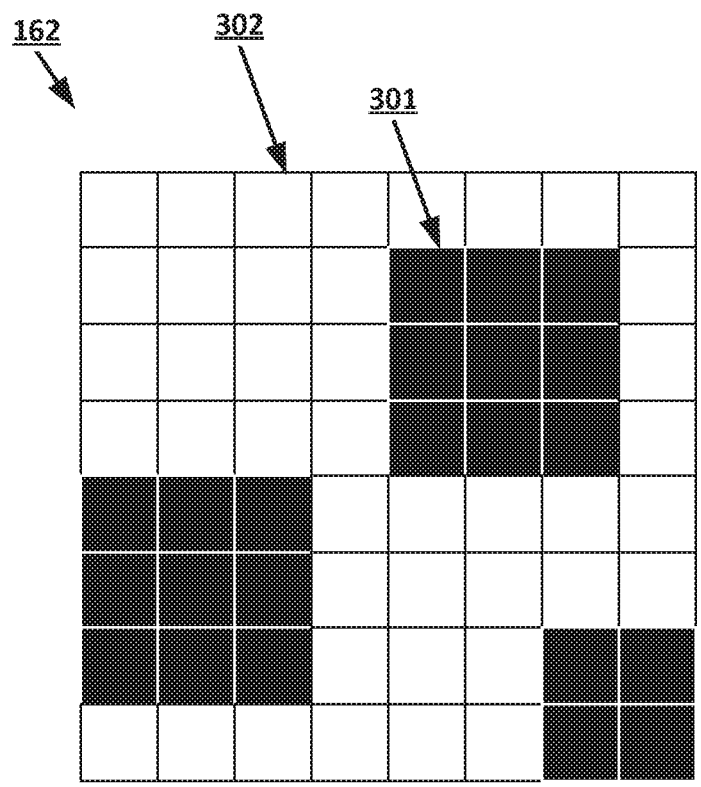
FIG. 3 shows an example arrangement for controlling location-based features with usage maps according to an implementation of the disclosed subject matter.

FIG. 3 shows an example arrangement for controlling location-based features with usage maps according to an implementation of the disclosed subject matter. The usage map 162 may divide a geographic area into sectors. Each sector may be encoded with data that determine how the operation of the location-based feature that usage map 162 controls of the application 110 may be modified when the computing device 100 is located in that sector. For example, the usage map 162 may be an "on/off" usage map the enables or disables the location-based feature. Sectors such as the sector 301 may be "on" sectors, while sectors such as the sector 302 may be "off" sectors. Whether a sector is determined to be an "on" or "off" sector may be based on the data used to generate the usage map 162. For example, the "on" sectors on the usage map 162 may be sectors that include, or are adjacent to sectors that include, a location of a restaurant that is associated with the application 110.

The usage map 162 may be encoded in any suitable manner. For example, the usage map may be encoded as an array, starting at the top left and going across the rows from left to right on the usage map 162, that indicates "on" sectors with "1" and "off" sectors with 0, resulting in an array of: "0000000000001110000011100000111011100000111000001110001100000011" This array may be compressed through run-length encoding, or through representation as a 32-bit or 64 bit integer. The usage map 162 may be encoded as an image, with "on" sectors represented by black pixels and "off" sectors represented by white pixels. The usage map 162 may be encoded based on the coordinates of the "on" sectors, which may result in an encoding of, for example: "(1,4), (1,5), (1,6), (2,4), (2,5), (2,6), (3,4), (3,5), (3,6), (4,0), (4,1), (4,2), (5,0), (5,1), (5,2), (6,0), (6,1), (6,2), (6,6), (6,7), (7,6), (7,7),", where (0,0) may be the coordinates of the top left sector and (7,7) may be the coordinates of the bottom right sector. This array may be compressed through run-length encoding.

Figure 4A:
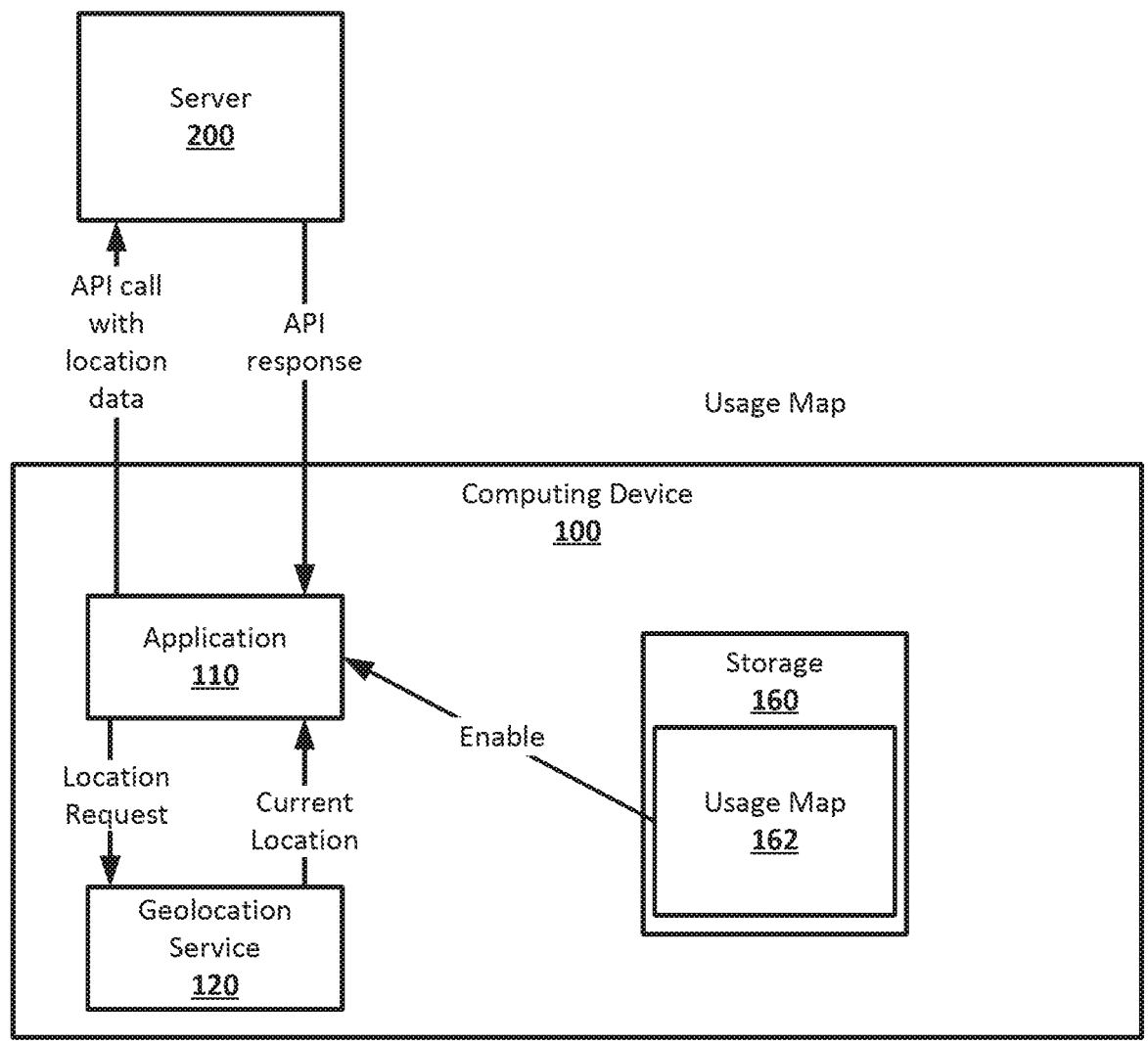
FIG. 4A shows an example arrangement for controlling location-based features with usage maps according to an implementation of the disclosed subject matter.

FIG. 4A shows an example arrangement for controlling location-based features with usage maps according to an implementation of the disclosed subject matter. The application 110 may, at any suitable time and interval, or directly before executing a location-based feature, determine which sector of the usage map 162 the computing device 100 is currently located in. The application 110 may submit a location request, which may be a local API call, to the geolocation service 120 of the computing device 100. The geolocation service 120 may determine the geolocation of the computing device 100, for example, through GPS, or WiFi or cellular triangulation. The geolocation service 120 may return the geolocation to the application 110 as the current location of the computing device 100.

The application 110 may determine which sector of the usage amp 162 the computing device 100 is currently in based on the current location. The application 110 may then decode the data in this sector of the usage map 162 and modify the operation of the location-based feature controlled by the usage map 162 in accordance with the decoded data. For example, if the usage map is stored as an array of 1's and 0's, and the sector the computing device 100 is currently in is a "1", the application 110 may enable the location-based feature controlled by the usage map 162. If the location-based feature was already enabled, its operational state may not change. If the location-based feature is disabled, it may be enabled.

After determining that the current location of the computing device 100 is in a sector that enables the location-based feature, the application 110 may use the location-based feature. The location-based feature may be used directly after the application 110 determines that that the location-based feature is enabled, or at a future time if the location-based feature is not disabled in the interim. The location-based feature may be, for example, a remote API call made to a sever, such as the server 200. The remote API call may include the current location of the computing device 100 as location data. The server 200 may return an API response that may include data based on the location data included in the API call. For example, the server 200 may return data for a geofence that may be used by the application 110 while the computing device 100 is near the current location that was sent to the server 200 as location data. The geofence may be associated with the data that was used to generate the usage map 162 and resulted in the sector of the usage map 162 that enabled the remote API call. For example, the geofence may encompass a location of a restaurant, which may also be located in, or in a sector adjacent to, the sector of the usage map 162 in which the computing device 100 was located and that was encoded with data indicating that the remote API call should be enabled.

Figure 4B:
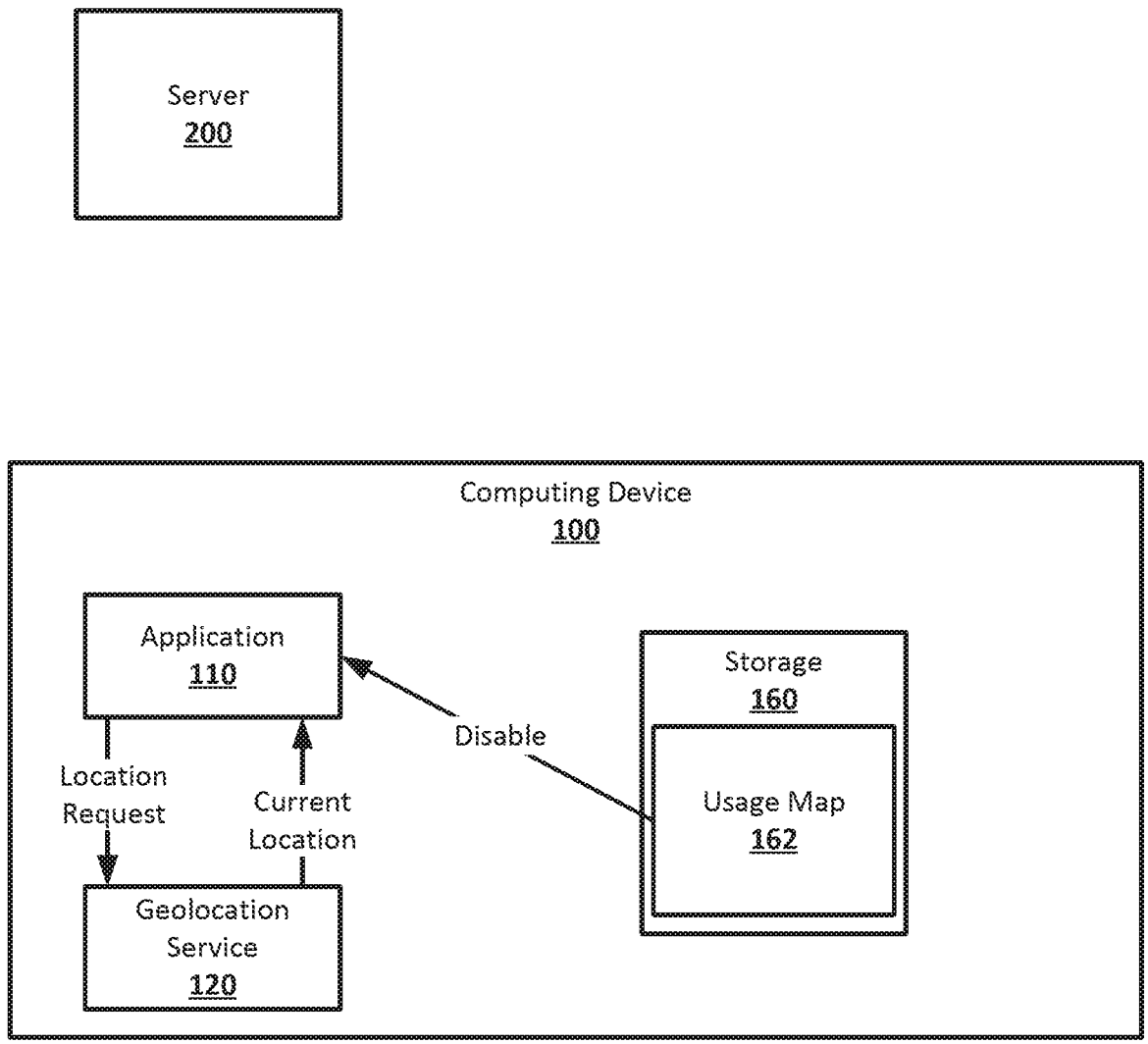
FIG. 4B shows an example arrangement for controlling location-based features with usage maps according to an implementation of the disclosed subject matter.

FIG. 4B shows an example arrangement for controlling location-based features with usage maps according to an implementation of the disclosed subject matter. The application 110 may, at any suitable time and interval, or directly before executing a location-based feature, determine which sector of the usage map 162 the computing device 100 is currently located in. The application 110 may submit a location request, which may be a local API call, to the geolocation service 120 of the computing device 100. The geolocation service 120 may determine the geolocation of the computing device 100, for example, through GPS, or WiFi or cellular triangulation. The geolocation service 120 may return the geolocation to the application 110 as the current location of the computing device 100.

The application 110 may determine which sector of the usage amp 162 the computing device 100 is currently in based on the current location. The application 110 may then decode the data in this sector of the usage map 162 and modify the operation of the location-based feature controlled by the usage map 162 in accordance with the decoded data. For example, if the usage map is stored as an array of 1's and 0's, and the sector the computing device 100 is currently in is a "0", the application 110 may disable the location-based feature controlled by the usage map 162. If the location-based feature was already disabled, its operational state may not change. If the location-based feature is enabled, it may be disabled.

After determining that the current location of the computing device 100 is in a sector that disables the location-based feature, the application 110 may not use the location-based feature. The location-based feature may not be used by the application from the time after the application 110 determines that the sector the computing device 100 is encoded to disable the location-based feature until a future time that the location-based feature is enabled, for example, due to the computing device 100 now being located in a geographic area that corresponds to a sector of the usage map 162 that is encoded with data for enabling the location-based feature. The location-based feature may be, for example, a remote API call made to a sever, such as the server 200, and the application 110 may not make the remote API call to the server 200 while the location-based feature is disabled. This may result in the application 110 only submitting a remote API call with location data to the server 200 in order to retrieve data, such as data for a geofence, when the application 110 is in a geographic area where there will be data to retrieve, reducing the number of remote API calls. If the location-based feature is a local API call, or a location-based procedure of the application, disabling the location-based feature based on the usage map 162 may result in the application 162 using less processor time on the computing device 100, which may also reduce energy usage by the computing device 100 and extend battery life.

Figure 5:
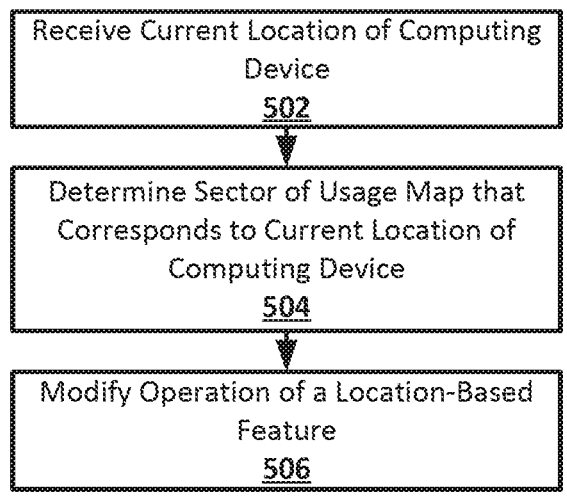
FIG. 5 shows an example procedure suitable for controlling location-based features with usage maps according to an implementation of the disclosed subject matter.

FIG. 5 shows an example procedure suitable for controlling location-based features with usage maps according to an implementation of the disclosed subject matter. At 502, a current location of a computing device may be received. For example, the application 110 running on the computing device 100 may send a request to the geolocation service 120 of the computing device 110. The geolocation service 120 may determine the geolocation of the computing device 100 and return the geolocation as a current location to the application 110.

At 504, a sector of the usage map that corresponds to the current location of the computing device may be determined. For example, the usage map 162 may be associated with the application 110. The application 110 may determine which sector of the usage map 162 corresponds to the current location of the computing device 100, for example, is a sector that includes the geographic area that the computing device 100 is located in.

At 504, the operation of a location-based feature may be modified. For example, the usage map 162 may control a location-based feature or features of the application 110. The application 110 may decode the encoded data of the sector that corresponds to the current location of the computing device 100 to determine how to modify any location-based feature controlled by the usage map 162. For example, if the usage map 162 is encoded as an array of 1's and 0's, each "1" or "0" in the array may represent a sector. If the sector of the usage map 162 that corresponds to the current location of the computing device 100 is represented by a "1", this may be decoded by the application 110 as an instruction to enable any location-based feature controlled by the usage map 162. If the sector of the usage map 162 that corresponds to the current location of the computing device 100 is represented by a "0", this may be decoded by the application 110 as an instruction to disable any location-based feature controlled by the usage map 162. The usage map 162 may also include sectors represented by a third value, or any number of other values, which may, for example, be instructions to the application 110 to rate-limit any location-based feature controlled by the usage map 162. For example, the usage map 162 may be encoded as an image, and the image may have pixels of more than two colors, indicating more than two types of modifications that may be made to the operation of location-based features of the application 110. The location-based feature whose operation is modified may be any feature of the application 110 that may use location data such as, for example, the current location of the computing device 100. The location-based feature may be, for example remote API call, local API call, or location-based procedure of the application 110. The usage map 162 may control multiple location-based features of the application 110, and a sector of the usage map 162 may be encoded with data that instructs the application 110 which location-based features to modify the operation of and what modifications to make.

Figure 6:
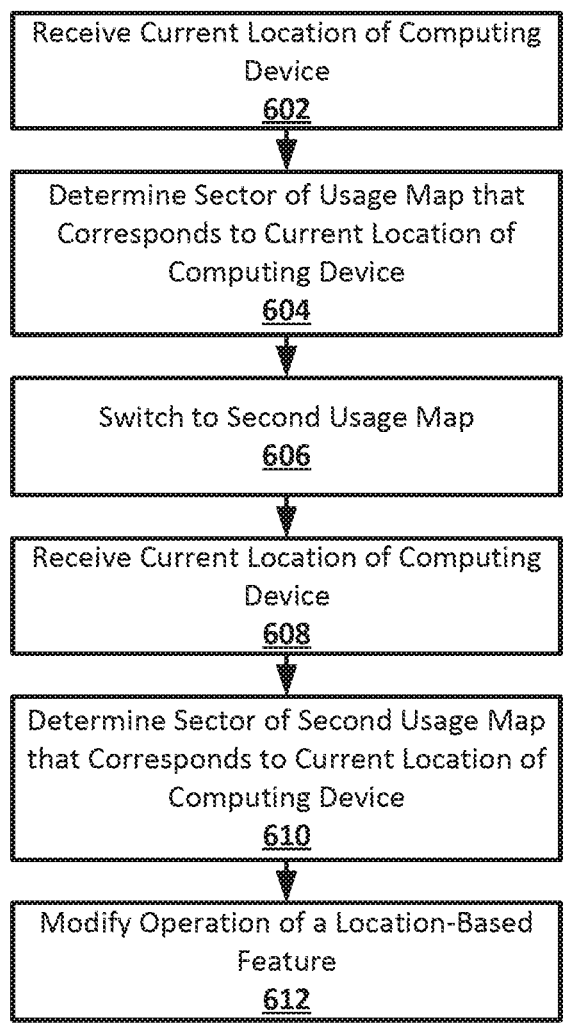
FIG. 6 shows an example procedure suitable for controlling location-based features with usage maps according to an implementation of the disclosed subject matter.

FIG. 6 shows an example procedure suitable for controlling location-based features with usage maps according to an implementation of the disclosed subject matter. At 602, a current location of a computing device may be received, for example, as in 502.

At 604, a sector of the usage map that corresponds to the current location of the computing device may be determined, for example, as in 504.

At 606, a second usage map may be switched to. The sector of the usage map 162 that corresponds to the current location of the computing device 100 may instruct the application 110 to switch to a second usage map. The second usage map may be associated with the application 110, and may have sectors that are sized differently than the sectors of the usage map 162, for example, being smaller of larger, making the second usage map more or less granular than the usage map 162. After switching to the second usage map, the application 110 may, when making a determination of what sector corresponds to the current location of the computing device 100, use the sectors of the second usage map instead of the sectors of the usage map 162. The second usage map may be used until the application 110 is instructed to switch back to the usage map 162, or to another usage map, by, for example, encoded data of a sector of the second usage map.

At 608, a current location of a computing device may be received, for example, as in 502.

At 610, a sector of the second usage map that corresponds to the current location of the computing device may be determined. For example, the application 110 may determine which sector of the second usage map the computing device 100 is located in based on the current location of the computing device 100.

At 612, the operation of a location-based feature may be modified. For example, the second usage map may control a location-based feature or features of the application 110. The application 110 may decode the encoded data of the sector that corresponds to the current location of the computing device 100 to determine how to modify any location-based feature controlled by the second usage map. The location-based feature whose operation is modified may be any feature of the application 110 that may use location data such as, for example, the current location of the computing device 100. The location-based feature may be, for example remote API call, local API call, or location-based procedure of the application 110.

Figure 7:
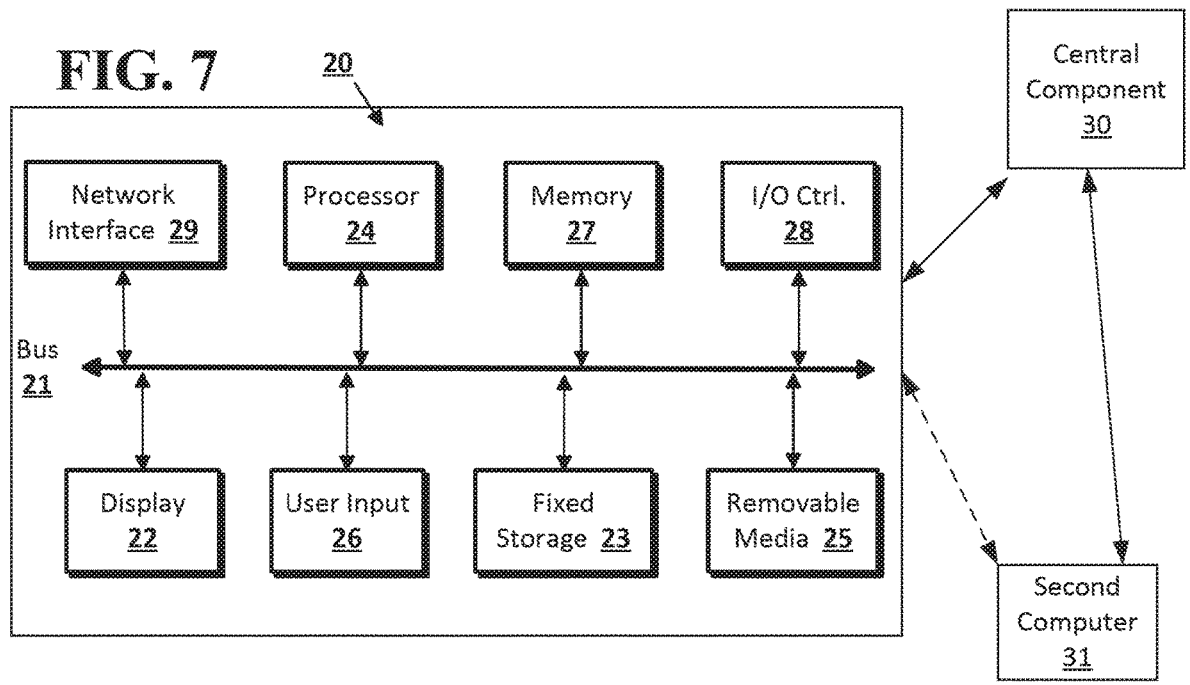
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touch-screen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
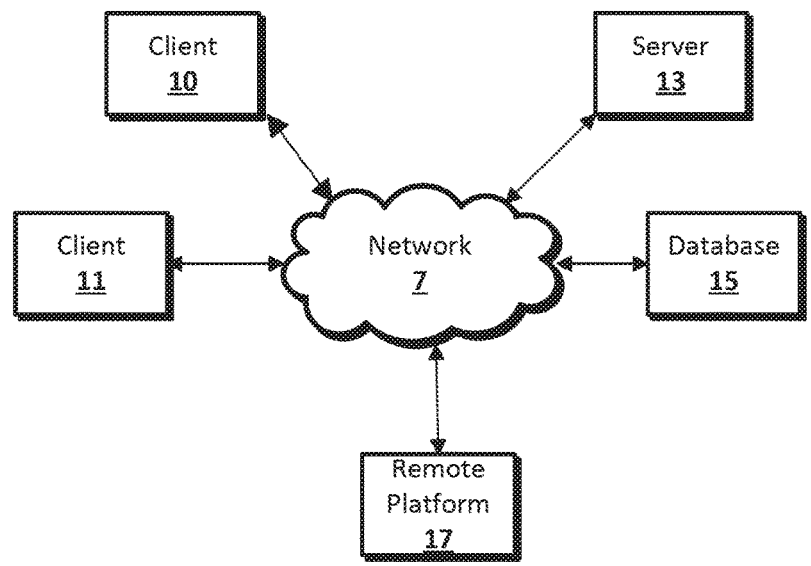
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method of controlling location-based features of an application running on a computing device, the method comprising:
receiving, by the application running on the computing device, a current location of the computing device;
determining, by the application, a sector of a usage map that corresponds to the current location of the computing device, wherein the usage map is associated with the application and wherein the usage map comprises a map of a geographic area divided into sectors; and
modifying, by the application, the operation of a remote API call of the application based on the sector of the usage map that corresponds to the current location of the device by disabling or rate-limiting, by the application, the remote API call, wherein disabling the remote API call comprises the application not making the remote API call, wherein rate-limiting the remote API call comprises limiting the number of times the application makes the remote API call over a time period, and wherein the application additionally decodes encoded data of the sector of the usage map that corresponds to the current location of the computing device to determine how to modify any location-based feature controlled by the usage map and wherein the usage map comprises an array of ones and zeroes for determining when to enable or disable the location-based features and the encoded data of the sector of the usage map comprises data from the array of ones and zeros.

2. The computer-implemented method of claim 1, further comprising modifying, by the application, the operation of at least one location-based feature of the application based on the sector of the usage map that corresponds to the current location of the computing device by enabling, disabling, or rate-limiting, by the application, a local API call or location-based procedure used by the application.

3. The computer-implemented method of claim 1, wherein each one of the sectors of the usage map is encoded with data that determines the modifying of the operations of location-based features of the application when the device is located in the one of the sectors.

4. The computer-implemented method of claim 1, further comprising:
receiving, by the application running on the computing device, a new current location of the computing device;
determining, by the application, a sector of a second usage map that corresponds to the new current location of the computing device, wherein the second usage map is associated with the application and the new current location of the computing device; and modifying, by the application, the operation of at least one location-based feature of the application based on the sector of the second usage map that corresponds to the new current location of the computing device.

5. The computer-implemented method of claim 4, wherein sectors of the second usage map are a different size than sectors of the usage map.

6. The computer-implemented method of claim 1, further comprising:
   determining, by the application, a sector of a second usage map that corresponds to the current location of the computing device, wherein the second usage map is associated with the application and the current location of the computing device; and
   modifying, by the application, the operation of at least one location-based feature of the application based on the sector of the second usage map that corresponds to the current location of the commuting device.

7. The computer-implemented method of claim 1, wherein the remote API call comprises a request for data associated with a geofence.

8. A computer-implemented system for controlling location-based features of an application running on a computing device with usage maps comprising:
   a storage that stores a usage map;
   a processor that receives, with the application running on the computing device, a current location of the computing device, determines, with the application, a sector of the usage map that corresponds to the current location of the computing device, wherein the usage map is associated with the application and wherein the usage map comprises a map of a geographic area divided into sectors, and
   modifies, with the application, the operation of a remote API call of the application based on the sector of the usage map that corresponds to the current location of the device by disabling or rate-limiting, by the application, the remote API call, wherein disabling the remote API call comprises the application not making the remote API call, and wherein rate-limiting the remote API call comprises limiting the number of times the application makes the remote API call over a time period, and wherein the application additionally decodes encoded data of the sector of the usage map that corresponds to the current location of the computing device to determine how to modify any location-based feature controlled by the usage map and wherein the usage map comprises an array of ones and zeroes for determining when to enable or disable the location-based features and the encoded data of the sector of the usage map comprises data from the array of ones and zeros.

9. The computer-implemented system of claim 8, wherein the processor further modifies, with the application, the operation of at least one location-based feature of the application based on the sector of the usage map that corresponds to the current location of the computing device by enabling, disabling, or rate-limiting, by the application, a local API call or location-based procedure used by the application.

10. The computer-implemented system of claim 8, wherein each one of the sectors of the usage map is encoded with data that determines the modifying of the operations of location-based features of the application when the computing device is located in the one of the sectors.

11. The computer-implemented system of claim 8, wherein the processor further receives, with the application running on the computing device, a new current location of the device, determines, with the application, a sector of a second usage map that corresponds to the new current location of the computing device, wherein the second usage map is associated with the application and the new current location of the computing device, and modifies the operation of at least one location-based feature of the application based on the sector of the second usage map that corresponds to the new current location of the computing device.

12. The computer-implemented system of claim 11, wherein sectors of the second usage map are a different size than sectors of the usage map.

13. The computer-implemented system of claim 8, wherein the processor further determines, with the application, a sector of a second usage map that corresponds to the current location of the computing device, wherein the second usage map is associated with the application and the current location of the device and modifies, with the application, the operation of at least one location-based feature of the application based on the sector of the second usage map that corresponds to the current location of the computing device.

14. The computer-implemented system of claim 8, wherein the remote API call comprises a request for data associated with a geofence.

15. A system comprising: one or more computers and one or more storage devices storing instructions which are operable, when executed by the one or more computers, to cause the one or more computers to perform operations for controlling location-based features of an application running on a computing device, the operations comprising:
   receiving, by the application running on the computing device, a current location of the computing device;
   determining, by the application, a sector of a usage map that corresponds to the current location of the computing device, wherein the usage map is associated with the application and wherein the usage map comprises a map of a geographic area divided into sectors; and
   modifying, by the application, the operation of a remote API call of the application based on the sector of the usage map that corresponds to the current location of the device by disabling or rate-limiting, by the application, the remote API call, wherein disabling the remote API call comprises the application not making the remote API call, wherein rate-limiting the remote API call comprises limiting the number of times the application makes the remote API call over a time period, and wherein the application additionally decodes encoded data of the sector of the usage map that corresponds to the current location of the computing device to determine how to modify any location-based feature controlled by the usage map and wherein the usage map comprises an array of ones and zeroes for determining when to enable or disable the location-based features and the encoded data of the sector of the usage map comprises data from the array of ones and zeros.

16. The system of claim 15, wherein the instructions cause the one or more computers to further perform operations further comprising modifying, by the application, the operation of at least one location-based feature of the application based on the sector of the usage map that corresponds to the current location of the computing device by enabling, disabling, or rate-limiting, by the application, a local API call or location-based procedure used by the application.

17. The system of claim 15, wherein the instructions cause the one or more computers to further perform operations further comprising:
- receiving, by the application running on the computing device, a new current location of the computing device;
- determining, by the application, a sector of a second usage map that corresponds to the new current location of the computing device, wherein the second usage map is associated with the application and the new current location of the computing device; and
- modifying, by the application, the operation of at least one location-based feature of the application based on the sector of the second usage map that corresponds to the new current location of the computing device.

18. The system of claim 15, wherein the instructions cause the one or more computers to further perform operations comprising:
- determining, by the application, a sector of a second usage map that corresponds to the current location of the computing device, wherein the second usage map is associated with the application and the current location of the computing device; and
- modifying, by the application, the operation of at least one location-based feature of the application based on the sector of the second usage map that corresponds to the current location of the computing device.

\* \* \* \* \*